(12) United States Patent
Siegrist

(10) Patent No.: US 8,498,405 B2
(45) Date of Patent: Jul. 30, 2013

(54) METHOD AND APPARATUS FOR ENHANCED CALL REPORTING

(75) Inventor: Joseph Siegrist, Vienna, VA (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 1698 days.

(21) Appl. No.: 11/742,136

(22) Filed: Apr. 30, 2007

(65) Prior Publication Data

US 2008/0267377 A1   Oct. 30, 2008

(51) Int. Cl.
*H04M 5/00* (2006.01)
*G06Q 30/00* (2012.01)

(52) U.S. Cl.
USPC .............. 379/266.1; 705/14.23; 705/14.49

(58) Field of Classification Search
USPC .... 705/14, 80, 26.1, 26.41, 26.7, 27.1; 707/3, 707/4; 379/142.15, 142.16, 92.04, 93.01; 370/352, 353, 354, 355, 356, 357; 455/414
See application file for complete search history.

(56) References Cited

U.S. PATENT DOCUMENTS

| | | | |
|---|---|---|---|
| 6,470,079 B1 | 10/2002 | Benson | |
| 6,515,968 B1 * | 2/2003 | Combar et al. | 370/252 |
| 6,965,870 B1 * | 11/2005 | Petras et al. | 705/14.54 |
| 2003/0043787 A1 * | 3/2003 | Emerson, III | 370/352 |
| 2004/0139032 A1 * | 7/2004 | Rowan | 705/80 |
| 2004/0152446 A1 * | 8/2004 | Saunders et al. | 455/411 |
| 2004/0234049 A1 * | 11/2004 | Melideo | 379/88.17 |
| 2005/0041647 A1 * | 2/2005 | Stinnie | 370/352 |
| 2006/0004627 A1 * | 1/2006 | Baluja | 705/14 |
| 2006/0229054 A1 * | 10/2006 | Erola et al. | 455/403 |
| 2007/0100956 A1 * | 5/2007 | Kumar | 709/217 |
| 2007/0124207 A1 * | 5/2007 | Faber et al. | 705/14 |
| 2007/0124290 A1 * | 5/2007 | Swanson et al. | 707/3 |
| 2007/0239528 A1 * | 10/2007 | Xie et al. | 705/14 |
| 2008/0162286 A1 * | 7/2008 | Lieberman et al. | 705/14 |
| 2008/0205655 A1 * | 8/2008 | Wilkins et al. | 380/279 |
| 2009/0019019 A1 * | 1/2009 | Jones et al. | 707/4 |
| 2010/0150325 A1 * | 6/2010 | Mulligan et al. | 379/93.01 |
| 2010/0262494 A1 * | 10/2010 | Marshall | 705/14.53 |

OTHER PUBLICATIONS

ThomasNet ProductNewsRoom, Retrieved Apr. 2, 2007 from http://news.thomasnet.com/printready.html?prid=801150, Press Release Date: Oct. 16, 2006.
WhosCalling, Retrieved Apr. 2, 2007 from http://www.whoscalling.com/clickpath.php.

* cited by examiner

*Primary Examiner* — Mohammad Islam
*Assistant Examiner* — Kharye Pope
(74) *Attorney, Agent, or Firm* — Miles & Stockbridge P.C.

(57) ABSTRACT

A system and method for enhanced tracking of calls resulting from referrals to a website from third party servers includes the steps of identifying a tracking parameter, dynamically allocating a phone number to the tracking parameter, displaying the dynamically allocated number on a web page, and tracking calls received on the number. The dynamically allocated number may replace an existing number on the web page. The tracking parameter can be a keyword used in a search, an identifier of the referring website, or any other parameter, including combinations thereof. The tracking parameter may be included in the referring URL, the URL of the website, or in the body of a web page. In some embodiments, the call tracking capability is provided by a service provider other than an operator of the merchant website and JavaScript is used so that the process is easy to implement by the merchant website.

22 Claims, 4 Drawing Sheets

METHOD AND APPARATUS FOR ENHANCED CALL REPORTING

BACKGROUND

The use of the Internet for commercial purposes has grown substantially over the past decade. One of the most important venues for advertising these days is with keywords with search engines including Yahoo and Google. Such search engines will place ads on their websites when users search on particular keywords. Sophisticated reporting and tracking is available from the search engines when customers complete their transactions on the Internet, including what keyword brought what sales, what IP address they came from, what browser was used, how long it took to complete the transaction, etc.

However, when a customer who desires to speak over the telephone dials a number displayed on a website, that tracking data is lost. There is no way to link up the data without changing behavior by doing something such as putting an ID number on the web page and requesting the customer give that ID number either via IVR (interactive voiced response) or in person during the phone call, or by using 'Click to Call' (a commercial service offered by the assignee of the present invention). Changing behavior isn't usually practical or desirable. Therefore, a method for tracking that does not require behavioral changes on the part of customer is desirable.

SUMMARY

A system and method for enhanced tracking of telephone calls resulting from a referral to a merchant website from a third party website includes the steps of identifying a tracking parameter, dynamically allocating a phone number from a pool of phone numbers to the tracking parameter, displaying the dynamically allocated phone number on a web page being viewed by an end user, and tracking calls received on the phone number to provide an indication of the effectiveness of the advertising associated with the tracking parameter. The tracking parameter can be a keyword used in a search to find the merchant website, an identifier of the referring website, the location of a link to the merchant website from the referring website, or any other parameter for which tracking is desired, as well as combinations of the foregoing. In some embodiments, the tracking parameter is included in the URL used to access the merchant website. In other embodiments, the tracking parameter is identified through an examination of the referring website information. In some embodiments, the call tracking capability is provided by a service provider other than an operator of the merchant website. In such embodiments, JavaScript is preferably used so that the process is simple to implement for the merchant.

There are several ways in which the phone numbers may be dynamically allocated, and the choice of a particular allocation scheme involves a tradeoff in cost versus specificity. In one aspect of the invention, a phone number is dynamically allocated to a tracking parameter and is returned to the pool of unallocated telephone numbers after a predetermined period of time if no further referrals involving the same tracking parameter are received. In other embodiments, a unique phone number is allocated to each visitor for which tracking is desired for a predetermined time period, and tracking parameters for that user are collected and reported. The allocated phone number is returned to the pool after the expiration of the predetermined time period.

In some embodiments, the information pertaining to a phone number allocated according to either of the aforementioned methods is retained after the phone number has been returned to the pool of unallocated numbers due to the expiration of the predetermined time period so that a phone call to such a phone number can be completed and tracked using the retained information if the call is received before the phone number is reallocated.

In some embodiments, identifying information such as an ANI (automatic number identification) for a caller who has called a dynamically allocated number is retained for a predetermined period of time (e.g., a few hours, a few days, a week, or longer) so that a subsequent phone call from the same caller can be routed to the same original destination even if the telephone number has since been re-allocated to a different destination.

DETAILED DESCRIPTION

In the following detailed description, a plurality of specific details, such as methods for establishing calls between a user and a customer service agent and particular JavaScript commands for implementing various functions, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

The embodiments discussed below involve the provision of a call tracking service provided by a third party service provider to the operator of a merchant website that receives referrals from one or more other websites operated by parties unrelated to any other party involved in the transaction. The third party service provider provides JavaScript code to the merchant website, provides the dynamically allocated telephone numbers and the telephone service, and reports the call tracking information to the owner of the merchant website. However, it should be understood that the call tracking and dynamic telephone number allocation methods discussed herein can also be performed by the operator of the merchant website.

Figure 1:
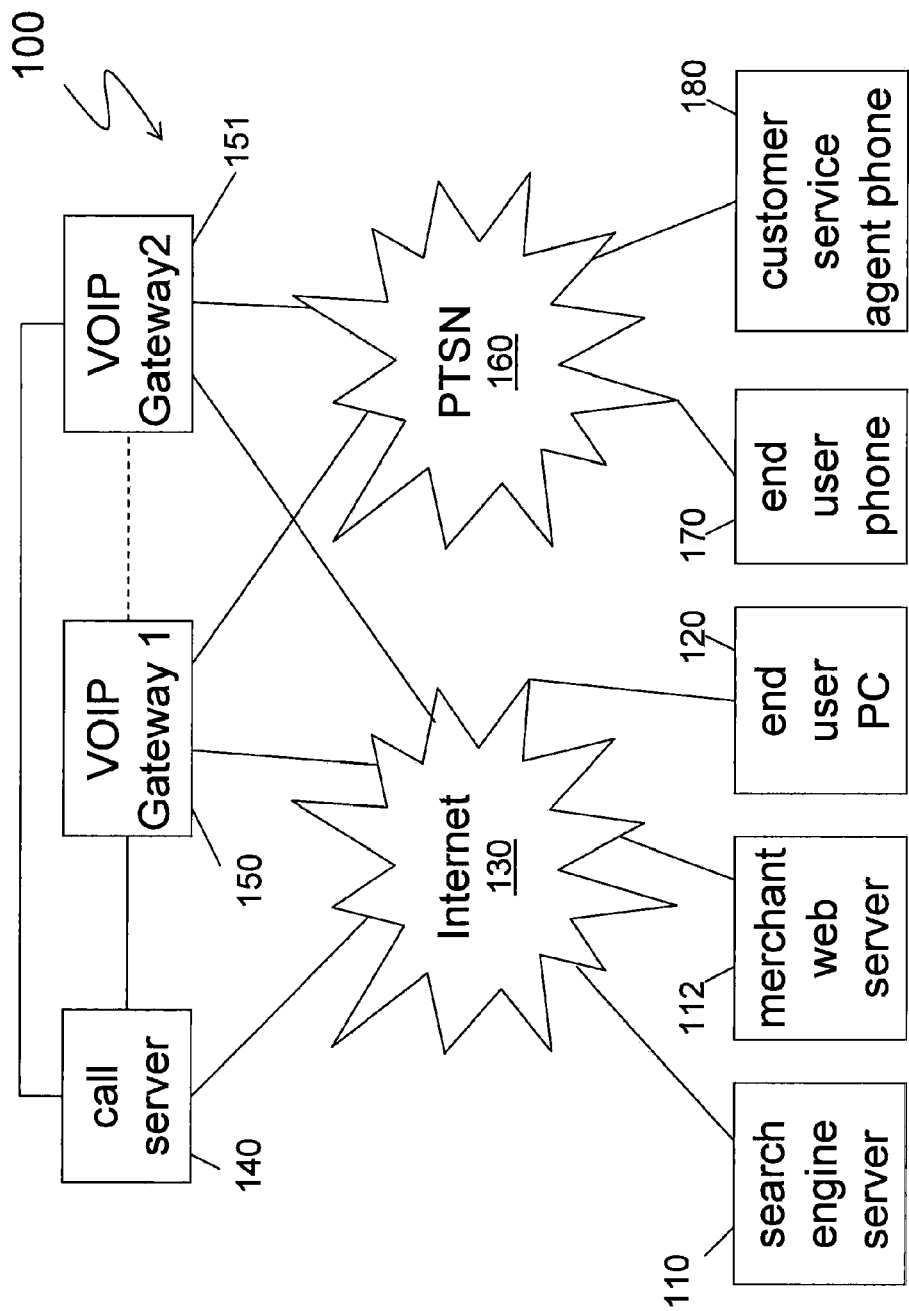
FIG. 1 is a block diagram of a system for enhanced call processing according to an embodiment of the invention.

FIG. 1 illustrates a system 100 for call reporting according to an embodiment of the present invention. The system 100 includes a search engine server 110 to which an end user PC 120 equipped with a browser (e.g., Internet Explorer, Firefox, etc.) can connect via Internet 130 in order to locate information. The search engine server 110 may be, for example a Google server. The end user associated with end user PC 120 may enter keywords as search terms at the search engine server 110 in order to locate desired information concerning a product or service the end user wishes to purchase. In response to the user's request, the search engine server 110 may list one or more URLs containing the keyword, including a URL associated with merchant web server 112. (Although a search engine server is used in this example, it should be understood that the techniques discussed herein can be used in connection with any server that is capable of providing a referring link to merchant web server 112). Merchant web server 112 provides one or more web pages including at least one PSTN (public switched telephone network) telephone number that the end user may call to obtain additional information about the products and services described on the website associated with merchant web server 112. The end user may then choose to call the phone number provided on merchant web server 112 using end user phone 170 to contact a customer service agent at phone 180 via the PSTN 160 in order to obtain the desired additional information and/or place an order for the products or services.

Also connected to the Internet 130 is a call server 140. The call server 140 is in communication with a first VOIP (voice over internet protocol) gateway 150 and a second VOIP gateway 151 (two VOIP gateways are shown in FIG. 1, but additional VOIP gateways are present in other embodiments). The VOIP gateways, which are available from a variety of sources such as CISCO™, have the ability to convert a call from the PSTN (public switched telephone network) 160 to a VOIP (voice over Internet protocol) phone call. The call server 140 controls the VOIP gateways 150, 151 such that when an incoming PSTN call is received via the first VOIP gateway 150, the call server 140 determines the DID (direct inward dialing) number representing the phone number dialed by the calling party (which is dynamically allocated by the call server 140 as discussed in further detail below), determines a PSTN telephone number to which the incoming call should be directed, controls the second VOIP gateway 150 to place an outbound PSTN call to the PSTN telephone number determined in the previous step, and bridges the outbound call to the inbound call by connecting the VOIP input of one gateway to the VOIP output of the other gateway and vice versa as illustrated symbolically in FIG. 1 by the dashed line between gateways 150, 151. Although VOIP gateways 150, 151 are illustrated in the embodiment of FIG. 1, it should be understood that any call processing equipment that is capable of receiving an incoming PSTN call on one telephone number and redirecting the call to a second PSTN telephone number may be used in place of the VOIP gateways 150, 151 (e.g., a personal branch exchange with remote call forwarding capability), and that the destination could go directly to the desired location skipping remote call forwarding entirely.

Figure 2:
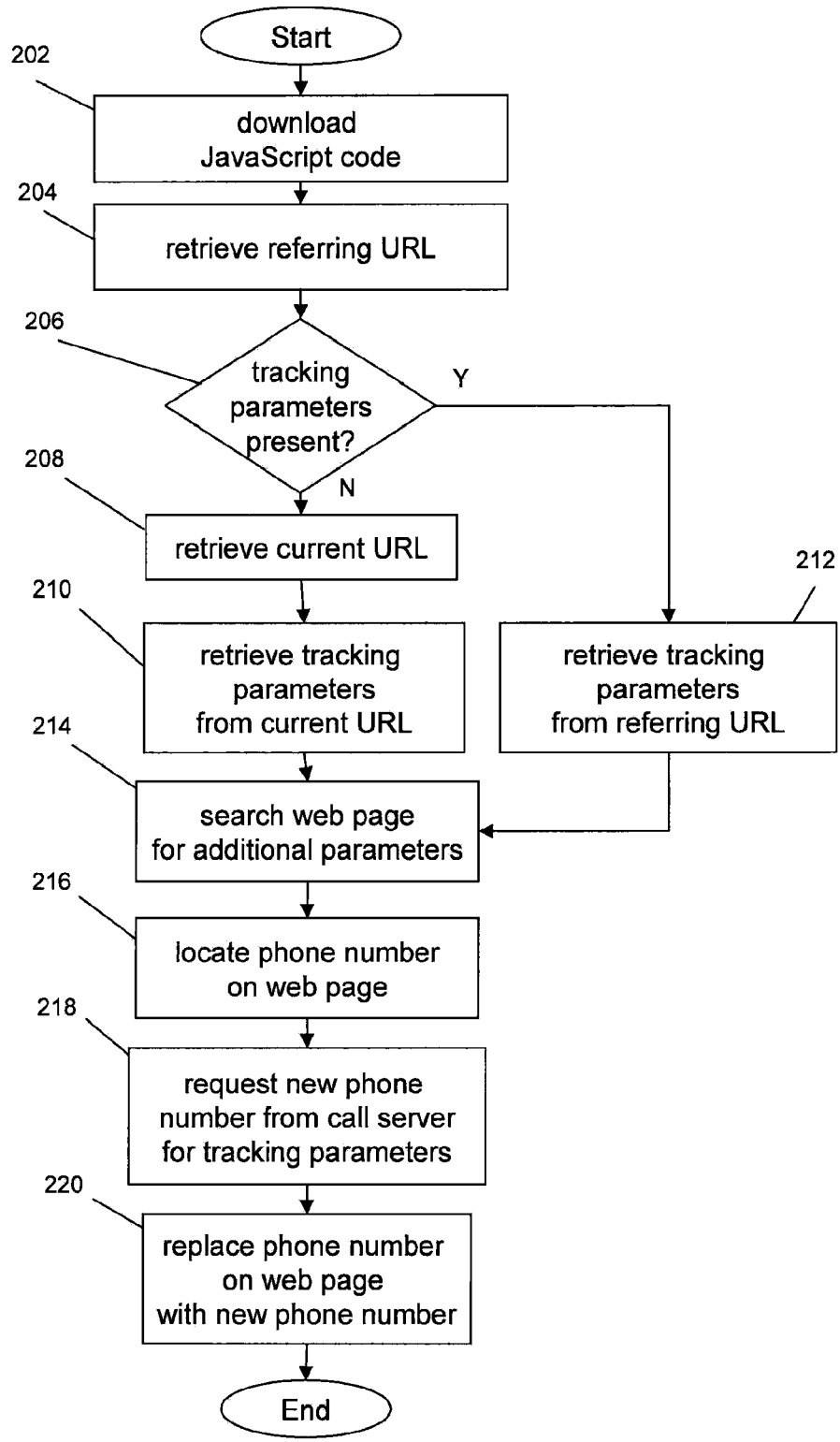
FIG. 2 is a flowchart of a JavaScript call reporting process performed on a client computer according to an embodiment of the invention.

Operation of the system 100 of FIG. 1 will now be discussed with reference to FIGS. 2, 3 and 4. FIG. 2 is a flowchart 200 illustrating processing that occurs at the end user PC 120. The process begins with the downloading of JavaScript code from the call server 140 at step 202 when a web page from merchant web server 112 is accessed by the end user PC 120 via a referral from the search engine server 110. In some embodiments, a web page served by the merchant web server 112 may include a single line of JavaScript code that will download other JavaScript commands to facilitate call tracking. An example of such a line of code is:

```
<script type='text/JavaScript'
    src='//as00.estara.com/fs/lr.php?accountid=200008070000'></script>
```

This line of code is preferably placed in the webpage's header, footer, or some other location in the webpage which will ensure that the line of code is always executed when the web page is loaded to the end user PC 120. This code results in the download of additional JavaScript code/commands from the call server 140. (In the description herein, "eStara" refers to the assignee of the present application which acts as a third party call tracking service provider). In applications in which a third party is providing the call tracking service to a merchant, providing the merchant with a single line of code to include on its web pages simplifies administration of the web page for the merchant. Alternatively, the downloaded JavaScript code can be included in the web page, thereby avoiding the necessity of downloading the code after the web page from the merchant server 110 is loaded. The use of JavaScript commands is preferable because it allows the collection and transmission of data from a web page on the user's PC 120 to a third party server 140 outside the domain of the merchant web server 110 without the use of a plug-in or other means that would require the user to perform some action.

The JavaScript commands downloaded at step 202 function to retrieve the URL of the referring web page at step 204. The availability of a referring URL is well known and widely supported. The referring URL is examined to determine whether search parameters are present at step 206. As is well known to those of ordinary skill in the art, the referring URL from a search engine such as Google can include the keywords and other information. For example, a search for the term "softphone" on the Google search engine returns a list of hits including the eStara webpage. The referring URL in such a case takes the form of http://www.google.com/search?hl=en&q=softphone&btnG=Search, which identifies the website as google.com, identifies the keyword as "softphone" and indicates that the URL was identified as a result of the user hitting the "Search" button on the Google website. In some various embodiments the keyword "softphone," the identification of the referring website "google.com," or both, constitute tracking parameters that are tracked for any phone call that results from the referral by the search engine server 110 to the merchant web server 112.

If search parameters are present in the referring URL at step 206, the tracking parameters are retrieved from the referring URL at step 212. If there are no tracking parameters in the referring URL at step 206, the current URL (i.e., the URL of the web page on the merchant server 112 currently being viewed on the end user PC 120) is retrieved at step 208 and any tracking parameter(s) in the current URL are retrieved at step 210.

After retrieval of the tracking parameters from the current URL at step 210 or the referring URL at step 212, the web page is searched for additional tracking parameters at step 214. These additional parameters may include, for example, information that identifies the end user. This information may be present in a form on the current web page or in a cookie associated with the web page. Such identification information may be used with embodiments in which a phone number is dynamically allocated for each user as discussed in further detail below. The search for additional tracking parameters should be understood to be optional. For example, in embodiments in which the only parameter that is tracked is a keyword, there is no need to search the web page if the keyword is identified in the referring URL or the current URL. The web page may be searched using techniques similar to those discussed in co-pending, commonly owned U.S. patent application Ser. No. 11/737,729, entitled "Method and Apparatus For Web Page Co-Browsing With a Standard Browser," the entire contents of which are hereby incorporated by reference herein. It should also be understood that step 214 may be executed periodically (e.g., once every two seconds) so that any information entered by the user after the web pages initially loads (e.g., the user may enter his/her name, address, etc. on a form on the page) can be captured and sent to the call server 140 after the initial message is sent as discussed in further detail below.

Next, any phone number present on the current web page is identified at step 216. This task is preferably performed at the end user PC 120 using JavaScript Regular Expressions, for common forms of telephone numbers. However, in some embodiments, a copy of the web page is created and sent to the call server 140 so that the call server 140 can locate any phone numbers. The copy of the web page may be created and sent to the call server 140 using techniques similar to those described in the aforementioned co-pending, commonly owned U.S. patent application. (It should be understood that step 216 is optional and that no phone number is listed on the web page in some embodiments prior to a phone number being dynamically allocated by the call server 140 and placed on the web page as discussed in further detail below).

Next, a message is sent to the call server 140 requesting a tracking phone number and providing the call server with the previously retrieved tracking parameters at step 218. Those of skill in the art will recognize that the tracking parameters and the request for a tracking phone number may be sent in separate messages or in a single message to the call server 140. The phone number on the web page is replaced with a tracking phone number received from the call server 140 at step 220.

Figure 3:
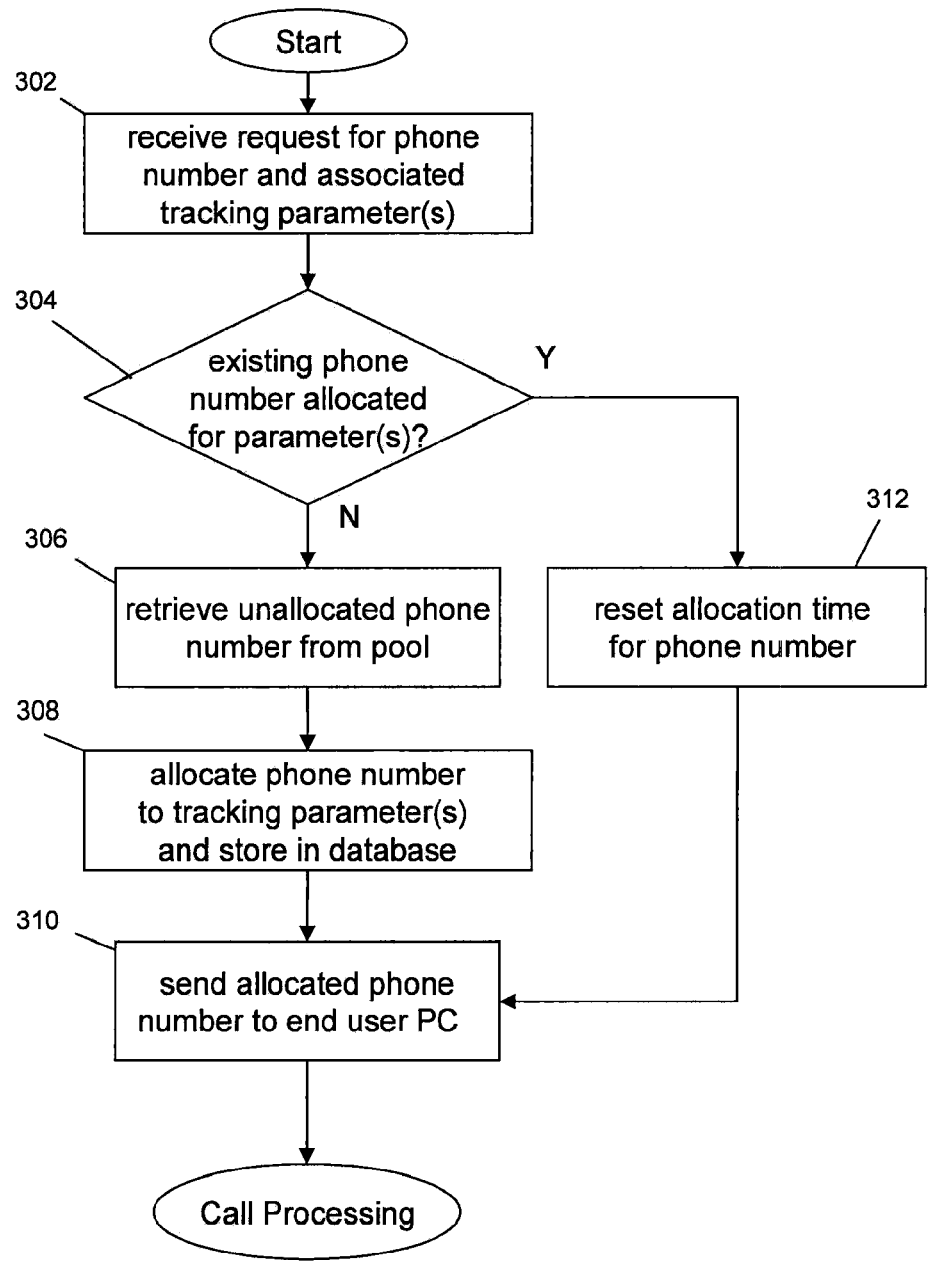
FIG. 3 is a flowchart of processing performed on a third party service provider server in response to a request for a dynamically allocated phone number according to an embodiment of the invention.

FIG. 3 illustrates the processing performed at the call server 140 upon receipt of the new phone number request/call tracking parameters message sent by the end user PC 120 at step 218. The message from the end user PC 120 is received at step 302. The call server 140 checks its existing database to determine if a phone number is currently allocated for the tracking parameters in the message at step 304. If no phone number is currently allocated for the tracking parameters in the message, an unallocated phone number is retrieved from a pool of unallocated phone numbers at step 306. The phone number is allocated to the tracking parameter(s) and the tracking parameters/phone number pairing along with a destination phone number associated with the pairing are stored in the database along with a time at which the allocation occurred at step 308. A background process at the call server 140 uses the allocation time stored in the database to determine whether the allocation has exceeded a predetermined time period and, if so, breaks any such allocation and returns the telephone number to the pool of unallocated telephone numbers. If there is an existing phone number allocation at step 304, the allocation time is updated at step 312. The allocated phone number is then sent to the end user PC 120 at step 310.

Figure 4:
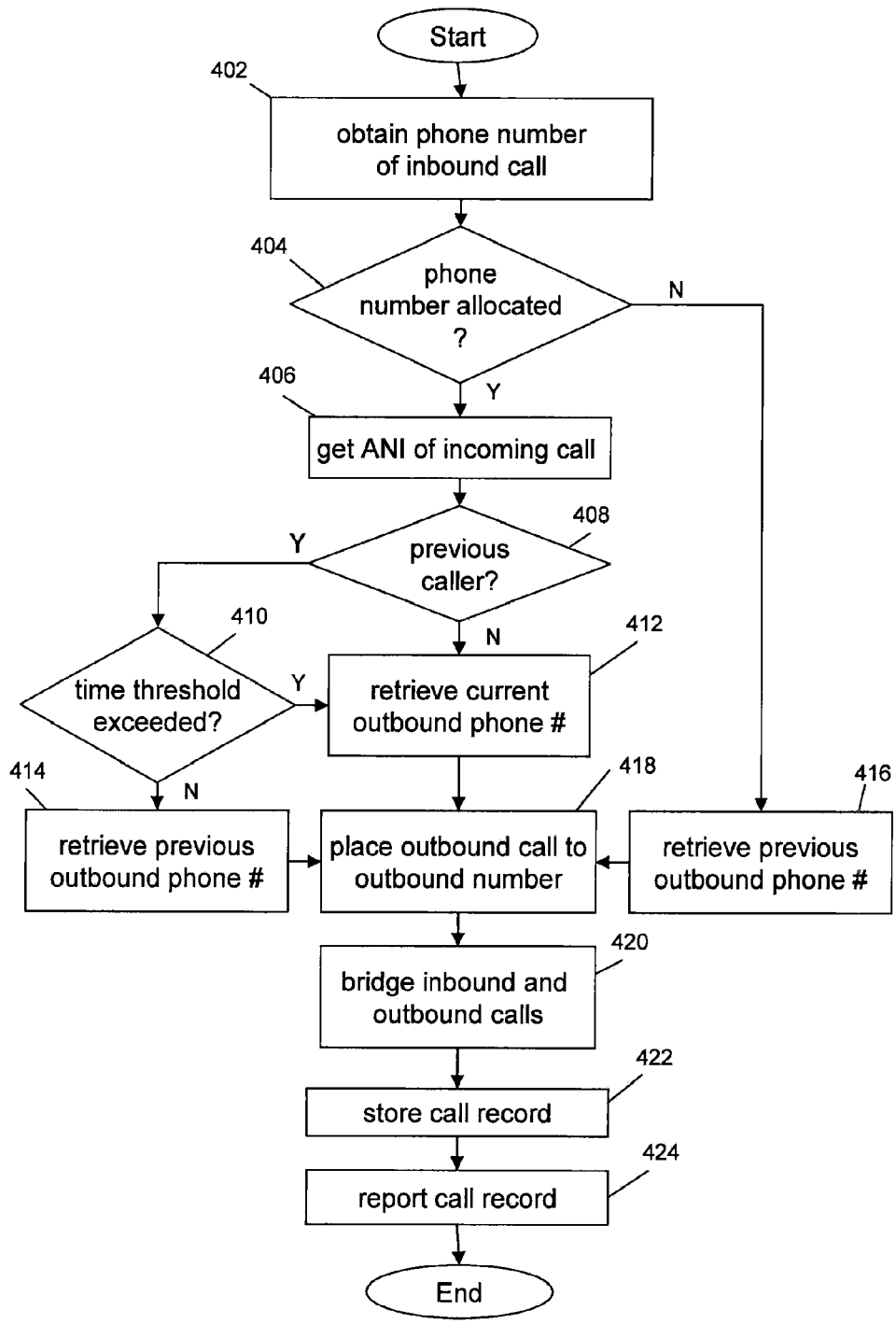
FIG. 4 is a flowchart illustrating the processing of a call received on a dynamically allocated phone number provided by the processing of FIG. 3.

FIG. 4 illustrates the processing performed by the call server 140 when a phone call is received. The phone number associated with an inbound call is determined at step 402. This determination may be made, for example, by determining the DID (direct inward dialing) associated with the call in a manner well known to those of skill in the art. Other techniques may also be used. The call server 140 then checks its database to determine whether the phone number associated with the incoming call is currently allocated at step 404. If there is no current allocation, the outbound phone number to which the phone number was previously allocated is retrieved at step 416. This is done to account for situations in which an end user unexpectedly waits for an amount of time in excess of the predetermined time period in order to place a call. (Alternatively, if a phone call is received on an unallocated phone number, an error may be declared and the phone call may be terminated).

If the phone number is allocated at step 404, the ANI (automatic number identification) of the incoming caller is obtained at step 406. As is well known in the art, the ANI identifies the telephone number of the calling party. If the ANI matches an ANI stored in the call server 140 database for a previous caller on the same telephone number, a check is made to determine whether the time since the previous call has exceeded a threshold at step 410. This threshold may be the same or different from the threshold discussed above. If the time since the has not exceeded the threshold, the outbound phone number to which the inbound phone number was previously allocated is retrieved at step 414. Otherwise, or if the ANI indicates that the inbound caller has not previously called the inbound telephone number, the outbound phone number to which the inbound phone number is currently allocated is retrieved at step 412. An outbound call to the telephone number retrieved at step 412, 414 or 416 is placed at step 418. The inbound and outbound calls are then bridged in the manner described above at step 420, and a record of the call is stored at step 422 either when the call is first connected or when it is terminated. The call record can include the tracking parameters (which, as discussed above, can include keyword(s), the identity of the referring webpage, the identity of the caller, the IP address of the caller, which web pages the caller visits, etc.), the time and date, the length of the call, and/or the phone number to which the outbound call was directed. The call record is reported at step 424. Step 424 may be performed on a per-call basis, or may be performed periodically such that information for a plurality of calls is reported.

Steps 406, 408, 410 and 414 discussed above are useful to avoid situations in which an end user initially dials a phone number to reach a party and then calls the same number later after it has been reallocated. This technique is referred to as "sticky days" by the assignee of the present invention. This technique is believed to be particularly well suited to situations in which a generic phone number listed on a search engine (or other) website is used to point at a highest bidder in a pay per call scenario (e.g., the search engine server offers referrals to the highest bidder from among a plurality of web merchants, and the destination phone number at the call server 140 that is associated with the generic phone number listed on the search engine server is changed depending on which web merchant bids the highest amount for the referral).

The use of dynamic number allocation represents a significant improvement over static allocations. While it is possible to statically assign telephone numbers to a small group of keywords, static allocations become impractical when the number of keywords is large. It is not uncommon to have hundreds of keywords, including dozens that may get very little traffic, and the keywords may be utilized in dozens of campaigns. There are a finite number of telephone numbers available, and reserving a dedicated telephone number costs money. Both available phone numbers and available funds would be depleted quickly using a static allocation scheme of any size. The use of dynamic allocation addresses this issue to a large extent.

However, the use of dynamic number allocation does involve some tradeoffs. For example, as discussed above, some embodiments simply allocate a phone number to a tracking parameter such as a keyword for some predetermined period of time. In these embodiments, some numbers allocated to popular keywords may stay allocated to the same keyword for long periods of time due to regular usage and updating of the time of allocation as discussed in connection with step 312 of FIG. 3. Other phone numbers allocated to less popular keywords may be frequently returned to the pool of unallocated numbers and reassigned. It is always possible that an end user may decide to call such a number after it has been reallocated to a different keyword and destination telephone number and even after the time threshold of step 410 (in those embodiments that include this optional processing) has been exceeded. In such a scenario, a phone call will erroneously be recorded and the end user will erroneously be connected to a party to which they did not wish to speak. The frequency of such an error will increase as the amount of time in which phone number/tracking parameter allocations are maintained is increased, but increasing this time will decrease the number of available telephone numbers thereby increasing the total number of telephone numbers needed and the cost associated therewith.

It will be apparent to those of skill in the art that numerous variations in addition to those discussed above are also possible. Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computerized method for tracking phone calls comprising:
   receiving at a call server at least one tracking parameter associated with a web page, wherein the web page is requested by an end user from an end user computer in response to the end user selecting a Uniform Resource Locator (URL) that corresponds to the web page;
   selecting a dynamically allocated phone number from a pool of unallocated phone numbers after the web page is requested by the end user and associating the dynamically allocated phone number with the tracking parameter and a destination phone number for a period of time;
   sending the dynamically allocated phone number associated with the tracking parameter to the end user computer, wherein the dynamically allocated phone number is displayed to the end user on the web page;
   receiving a call at the call server from the end user on the dynamically allocated phone number;
   connecting the call to the destination phone number associated with the dynamically allocated phone number; and
   reporting the occurrence of the call, the report including an identification of the tracking parameter.

2. The method of claim 1, further comprising the step of locating a first phone number on the web page, wherein the first phone number is replaced with the dynamically allocated phone number.

3. The method of claim 1, further comprising the step of determining whether a phone number is currently associated with the tracking parameter prior to the selecting step, wherein the phone number that is currently associated with the tracking parameter is placed in the web page based on a result of the determining step.

4. The method of claim 1, wherein the dynamically allocated phone number remains allocated to the tracking parameter for a predetermined period of time.

5. The method of claim 4, wherein a start of the predetermined period of time is reset each time the dynamically allocated phone number is placed in a web page.

6. The method of claim 1, further comprising the steps of determining an identity of a caller associated with the call to the dynamically allocated phone number, and connecting the call to a party that was previously but is no longer associated with the dynamically allocated phone number if the caller has previously placed a call to the dynamically allocated phone number within a predetermined period of time.

7. The method of claim 1, wherein the tracking parameter is included in a uniform resource locator (URL) associated with the web page.

8. The method of claim 1, wherein the tracking parameter is included in a URL of a referring web page.

9. The method of claim 1, wherein the tracking parameter is located in a body of the web page.

10. The method of claim 1, wherein the tracking parameter comprises a plurality of tracking parameters.

11. The method of claim 1, wherein the tracking parameter includes a keyword.

12. The method of claim 1, wherein the tracking parameter includes an identifier of a referring web page.

13. A system for tracking phone calls comprising:
    a processor; and
    a computer readable medium coupled to a processor and storing instructions that are executed by the processor, the instructions comprising:
    receiving at the system at least one tracking parameter associated with a web page, wherein the web page is requested by an end user from an end user computer in response to the end user selecting a Uniform Resource Locator (URL) that corresponds to the web page;
    selecting a dynamically allocated phone number from a pool of unallocated phone numbers after the web page is requested by the end user and associating the dynamically allocated phone number with the tracking parameter and a destination phone number for a period of time;
    sending the dynamically allocated phone number associated with the tracking parameter to the end user computer, wherein the dynamically allocated phone number is displayed to the end user on the web page;
    connecting a call from the end user on the dynamically allocated phone number to the destination phone number associated with the dynamically allocated phone number; and
    reporting the occurrence of the call, the report including an identification of the tracking parameter.

14. The system of claim 13, wherein the end user computer is further configured to perform the step of locating a first phone number on the web page, wherein the first phone number is replaced with the dynamically allocated phone number.

15. The system of claim 13, wherein the dynamically allocated phone number remains allocated to the tracking parameter for a predetermined period of time.

16. The system of claim 15, wherein a start of the predetermined period of time is reset each time the dynamically allocated phone number is placed in a web page.

17. The system of claim 13, wherein the tracking parameter is included in a URL associated with the web page.

18. The system of claim 13, wherein the tracking parameter is included in a URL of a referring web page.

19. A computerized method for tracking phone calls by comprising:
- receiving at a call server at least one tracking parameter associated with a web page, wherein the web page is requested by an end user from an end user computer in response to the end user selecting a Uniform Resource Locator (URL) that corresponds to the web page;
- selecting a dynamically allocated phone number from a pool of unallocated phone numbers after the web page is requested by the end user and associating the dynamically allocated phone number with the end user and a destination phone number for a period of time;
- sending the dynamically allocated phone number associated with the end user to the end user computer, wherein the dynamically allocated phone number is displayed to the end user on the web page;
- receiving a call at the call server from the end user on the dynamically allocated phone number;
- connecting the call to the destination phone number associated with the dynamically allocated phone number; and
- reporting the occurrence of the call, the report including an identification of the tracking parameter.

20. A non-transitory computer readable medium having instructions stored thereon that, when executed by a processor, causes the processor to track phone calls, the instructions comprising:
- receiving at least one tracking parameter associated with a web page, wherein the web page is requested by an end user from an end user computer in response to the end user selecting a Uniform Resource Locator (URL) that corresponds to the web page;
- selecting a dynamically allocated phone number from a pool of unallocated phone numbers after the web page is requested by the end user and associating the dynamically allocated phone number with the tracking parameter and a destination phone number;
- sending the dynamically allocated phone number associated with the tracking parameter to the end user computer, wherein the dynamically allocated phone number is displayed to the end user on the web page;
- receiving a call from the end user on the dynamically allocated phone number;
- connecting the call to the destination phone number associated with the dynamically allocated phone number; and
- reporting the occurrence of the call, the report including an identification of the tracking parameter.

21. The non-transitory computer readable medium of claim 20, wherein the dynamically allocated phone number remains allocated to the tracking parameter for a predetermined period of time.

22. The non-transitory computer readable medium of claim 21, wherein a start of the predetermined period of time is reset each time the dynamically allocated phone number is placed in a web page.

* * * * *